United States Patent [19]
Bailey et al.

[11] 4,431,991
[45] Feb. 14, 1984

[54] ENCODER FOR TRANSMITTED MESSAGE DEACTIVATION CODE

[75] Inventors: David F. Bailey, Plantation; Allen J. Weidler; Merle L. Gilmore, both of Ft. Lauderdale, all of Fla.; Gary W. Clow, Sierra Madre, Calif.

[73] Assignee: Motorola, Inc., Schaumburg, Ill.

[21] Appl. No.: 310,593

[22] Filed: Oct. 13, 1981

[51] Int. Cl.[3] .................. H04Q 7/00; H04Q 9/00; H04M 11/02
[52] U.S. Cl. .................. 340/825.52; 340/825.44; 340/825.47; 179/2 EC
[58] Field of Search .......... 340/311.1, 825.52, 825.44, 340/825.47, 825.76; 179/2 EC; 455/70, 54, 53, 49, 48

[56] References Cited
U.S. PATENT DOCUMENTS
4,178,476 12/1979 Frost ............................... 340/825.44

Primary Examiner—Donald J. Yusko
Attorney, Agent, or Firm—Philip R. Wadsworth; Joseph T. Downey; James W. Gillman

[57] ABSTRACT

An encoder for transmission of a digital deactivation code at the end of a variable length message transmission. The encoder adds a deactivation code to the end of an operator's transmitted message in order to inform the designated message receiving device that the message has concluded and thereby enable transmission of additional information immediately. Preferably, the encoder transmits a digital deactivation code immediately following a variable length voice message transmission.

21 Claims, 9 Drawing Figures

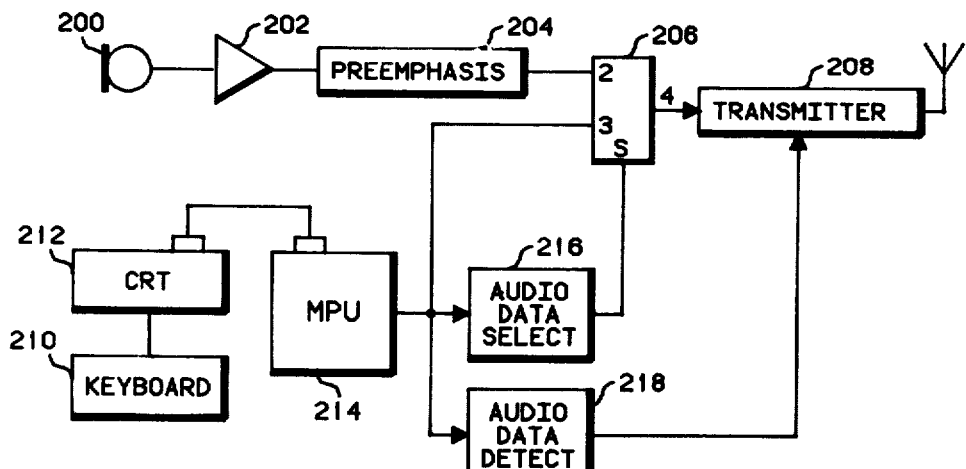
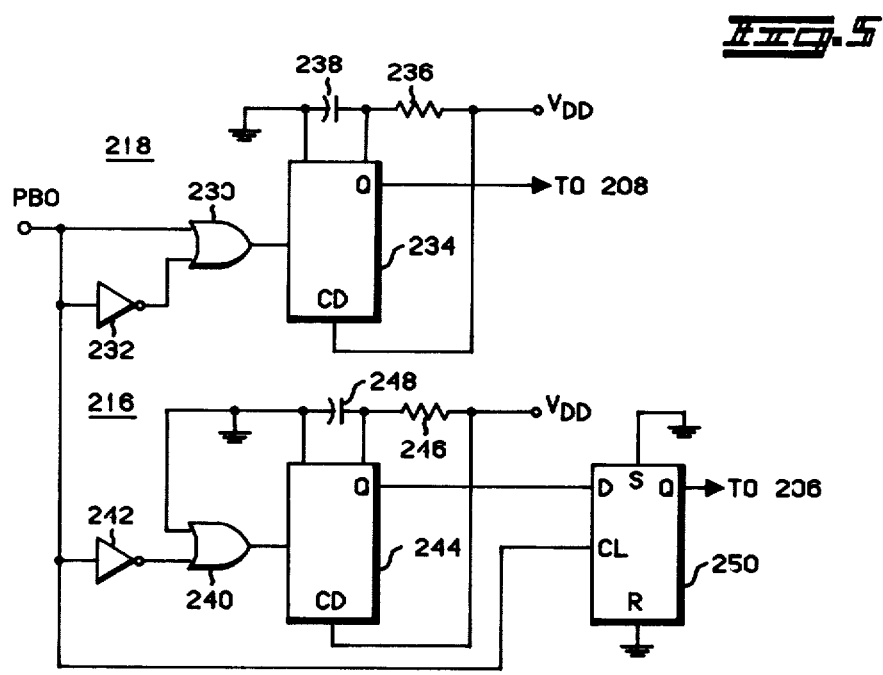

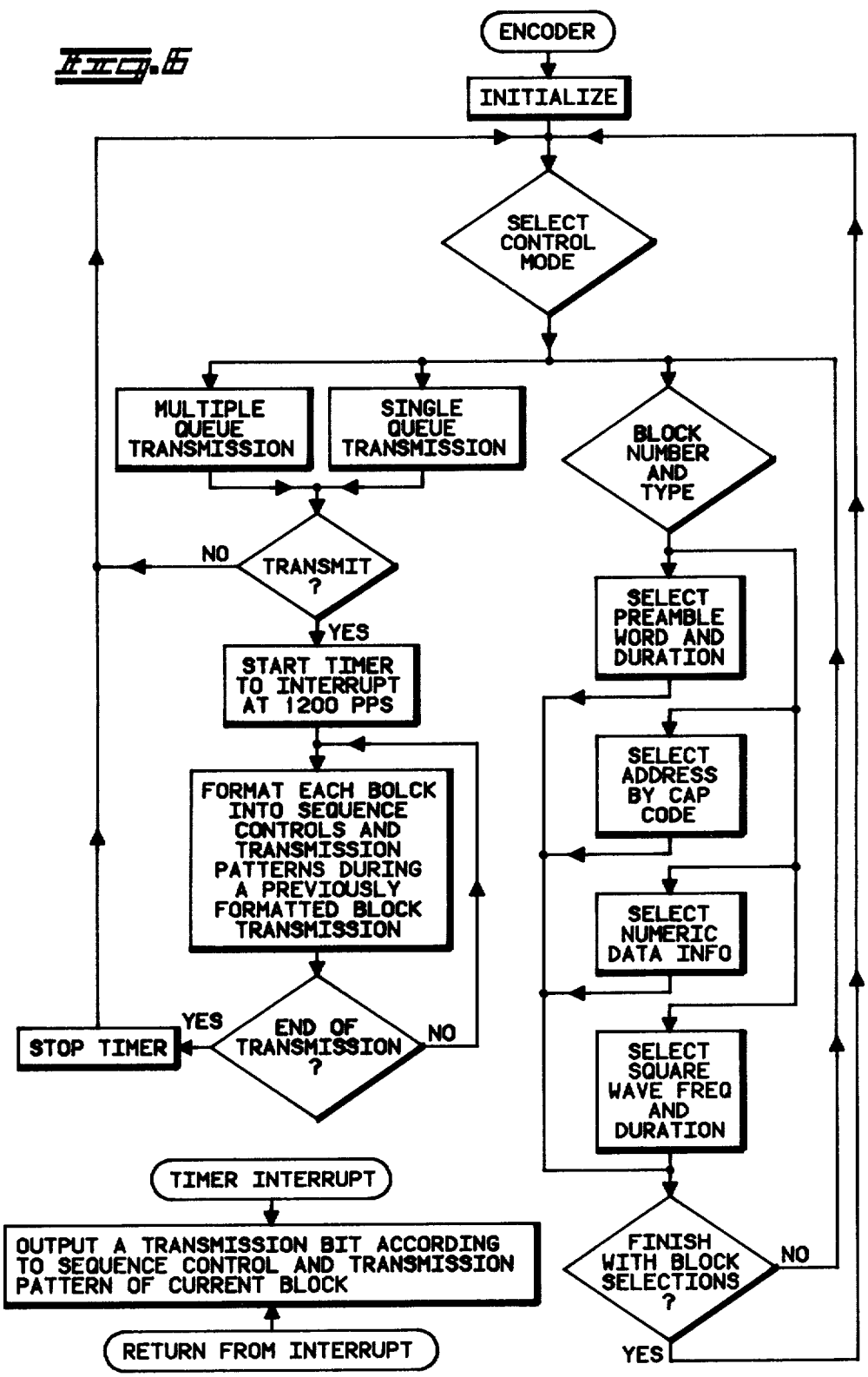

ENCODER FOR TRANSMITTED MESSAGE DEACTIVATION CODE

BACKGROUND OF THE INVENTION

The concept of squelch is to automatically quiet or mute a radio receiver in response to a specified input signal characteristic and circuits for providing this operation are well known in the art. In high gain receivers the speaker noise produced by the absence of carrier on a given frequency can be very annoying to a operator. Normally such squelch circuits continuously monitor for a presence of an RF signal or carrier. When no signal is detected the squelch circuit is activated and the audio channel becomes inoperative.

One of the principal difficulties with such detection systems is that they require constant monitoring for the detection for the presence of carrier and can cause a substantial power drain. When applied to a paging receiver system with a large number of pagers with a correspondingly high message traffic rate, the transmitter carrier signal may never be shut down because of the volume of traffic. Therefore the absence of carrier would never be detected so taht such squelch circuits could not operate correctly. A further difficulty is that the usual analog circuitry to achieve squelch requires some period of time to confirm detection and activation. Thus there frequencly occurs a tailing off of the audio channel. The deactivation control word of the present invention operates to selectively squelch the paging receiver which has been selectively addressed. Thus, only the pager which has been correctly addressed and received the message undergoes deactivation.

The use of a deactivation control word for achieving this function with respect to a paging system has the distinct advantage that not only can the voice channel and thus the operator reception be clear of the annoying noise sound but it permits messages to be more tightly packed and thus increase the message throughput.

In the system of the preferred embodiment, the coding format to achieve paging is digital in nature and therefore the coding signal which is utilized to provide the deactivation control is itself a digital signal. Thus the squelch operation of the paging recevier has the same sensitivity as for normal the paging. The use of a digitally encoded word to achieve squelching in such a circuit provides many advantages. The use of a positive deactivation contol word at the conclusion of a variable length audio message provides utilization of the now wanted normal time out allocated for fixed length message systems and allows a more tightly packed message arrangement, thus increasing throughput for the entire system.

SUMMARY OF THE INVENTION

It is an object of the present invention to provide an improved encoder for transmitted coded information.

It is a further object of the invention to provide an encoder which can control the termination of processing of transmitted coded information by a receiver.

An encoding device for generating sequential code signals containing information which is to be transmitted by means of electromagnetic radiation to selected receivers in a plural population of receivers comprising means for generating coded signals to address at least one receiver, in said plural population, means for producing coded information to be processed by addressed receivers, and means for generating coded deactivation signals subsequent to the coded information to cause the addressed receivers to terminate processing of coded information.

BRIEF DESCRIPTION OF THE DRAWINGS

FIG. 4 is a functional block diagram of the firmware embodiment of the present invention.

FIG. 5 is an electrical schematic of a portion of FIG. 5.

FIG. 6 is a flowchart for the firmware embodiment of the present invention.

DESCRIPTION OF THE PREFERRED EMBODIMENT

Figure 1:
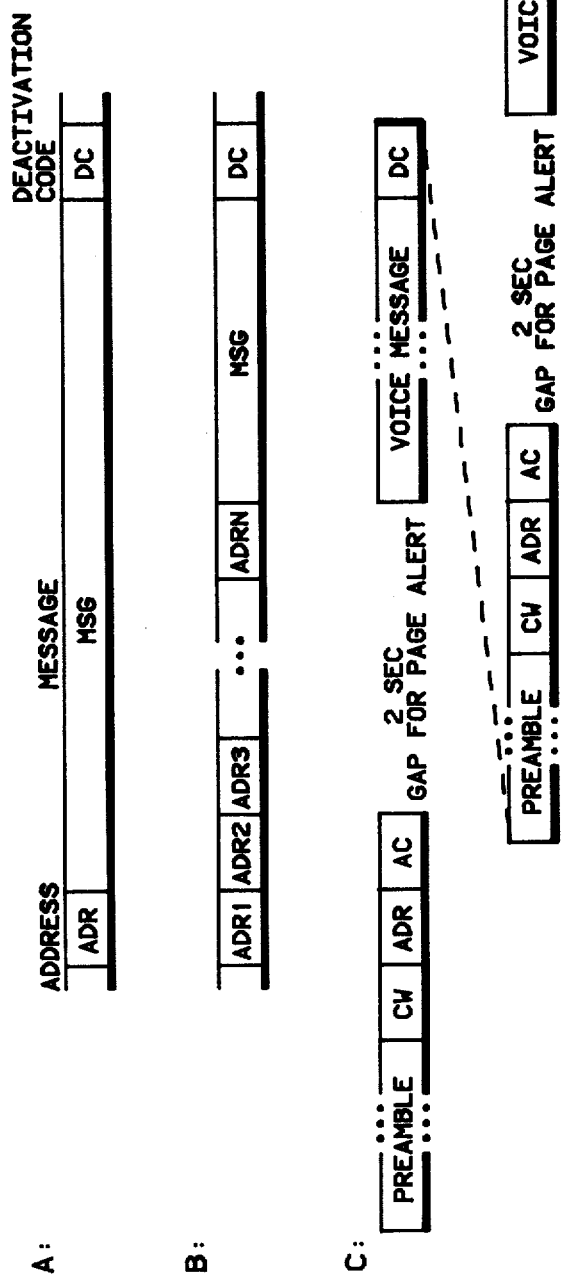
FIGS. 1 A-C are timing diagrams for the encoded message system for the present invention.

FIG. 1 is a timing diagram depicting the use of a deactivation control word in conjunction with a message system. FIG. 1A shows in time sequence extending from left to right that an individual receiver is addressed from a transmitter terminal and at the conclusion of the address the receiver is actuated to receive a message. The message is generally a voice message and during the first portion of which there is an alert time followed by a real time or otherwised modified voice signal which could also include data information. It is assumed a priory that the message to be sent by such a terminal system can be of a variable length.

It is well known in the art that when such message systems provide a fixed length period that frequently the entire fixed time is not used thereby causing a waste of system time and a resultant diminishment of the the number of messages per unit time that can be handled by the system. At the conclusion of the message portion there is included as shown in FIG. 1A a deactivation control signal which for the preferred embodiment is a digital word which causes the individually addressed receiver and only that receiver to disable the audio channel so that there is no disturbance to the receiver in the form of carrier or other background noise and ensure that the broadcast transmitter can then be immediately used for addressing additional receivers. The advantages of such a deactivation code are that the variable length messages can be positively terminated with the same distinction as the initial activation of a receiver upon a receipt of its correct address.

FIG. 1B shows a variant form of the use of the deactivation code signal in which a plurality of addresses of individual receivers may be sequenced together in the form of a batch. At the conclusion of the last address in the batch the message is commenced and at the conclusion of the message the deactivation control word operates to terminate the audio operation of all of the previously addressed receivers. In FIG. 1B it is tacitly assumed that the number of receivers that constitute such a batch would effect the message duration in that if there were an alert time which were to be part of the message operation that sufficient time have to be allocated so that the receiver user of the last addressed receiver would have sufficient alerting time for the message. At the conclusion of the variable length message as in the case of voice, all of the addressed receivers would have the audio channel turned off by a reception of the deactivation control word thus the broadcast channel would immediately become available for additional message transmission.

While it is clear that many types and formats of signal coding may be utilized for the present invention the preferred embodiment utilizes a digital signal system designated as the Golay Sequential code. The Golay Sequential Code (GSC) is a selective call paging protocol based largely on the current Golay binary paging format. A full description of the Golay code may be found in a paper entitled "Selective Signalling for Portable Applications" by Leonard E. Nelson, 28th IEEE Vehicular Technology Conference, Denver, Colo., Mar. 22-24, 1978. The Golay Sequential Code is an NRZ binary signaling format that has been greatly modified from an earlier format to accommodate intermixed tone only, tone and data, as well as tone and voice paging and now improved battery saving.

The GSC is an asynchronous paging format which allows pages to be transmitted individually or in batches. Maximum message throughput for tone only and tone and data pages is achieved in the batch transmission mode; while the individual call mode is useful in tone and voice paging.

The single call address format consists of a preamble, a control word, an address code, and for voice paging, an Activation Code (AC). The preamble serves to divide pagers within the system into groups for improved battery life, as well as to uniquely identify GSC transmissions from other coding schemes to faciliate channel sharing without sacrificing battery life or false call integrity. The control word delimits the end of the preamble and it supplies timing information for the batch mode decoding. The address uniquely identifies each pager and the AC is used to control the pager audio circuits in voice paging. The batch mode of operation allows a string of addresses to be transmitted following the control word.

A data message consists of an address followed by one or more data blocks. Data messages may be transmitted individually in the single call mode or intermixed with address only pages in the batch mode of transmission. Address and data blocks are exactly the same length. The address information is constructed from words selected from the Golay (23, 12) cyclic code while the data information is encoded using the (15, 7) BCH code. Address information is transmitted at 300 bits/second while data information is transmitted at 600 bits/second.

In addition to enabling pagers to operate in a battery saver mode, the polarity of the preamble identifies the transmission mode single call or batch. For instance, when the preamble words are transmitted with one predetermined bit polarity, the single call mode is identified; if the preamble bits are inverted, the batch mode is indicated.

The control word activation code and address code all use a two word format consisting of 28 bits of comma followed by two (23, 12) code words. The comma is a 1, 0 bit reversal pattern transmitted at 600 bits/second. The two Golay code words (Word 1 and Word 2) are separated by a ½ bit space. The polarity of the ½ bit space shall be opposite the first bit of the second word and the starting comma bit must be of the same polarity as the first bit of the first word. The control word and activation code are predetermined for the preferred system. Word 2 of the control word and activation code are the inverses of the fixed words.

The address format is identical to the control word and activation code formats regarding the number of bits, the rules for comma and the ½ bit space. The address Word 2 may be chosen from any word of the (23, 12) code set except the all 0's and all 1's combinations. Thus, there are 4094 potential second words made up of 12 information bits and 11 parity bits. The first words are chosen from a 100 word subset of the Golay code. To generate the binary bit patterns for the (23, 12) Golay code, the decimal representation of the code word is converted to binary. This binary representation is rewritten LSB to the left.

Tone only pages are those pager addresses which don't involve a voice message. Although the single call mode can be used, the batch mode of operation is the preferred method of address transmission for tone only and tone and data pages. The activation code is generally not used in tone only paging, but it may be and an extended batch mode is especially useful in the high traffic periods.

The batch transmission format begins with an inverted preamble followed by the control word and up to 16 pager addresses or data blocks. The arriving page requests should be grouped as a function of preamble and transmitted on a time or traffic basis at the discretion of the terminal manufacturer and his customer.

It may be desirable to transmit more than 16 addresses within a single preamble batch. The extended batch mode is intended for these situations. The extended batch scheme extends the batch mode in multiples of 16 addresses without requiring the retransmission of the preamble. To accomplish this extension, the terminal need only send the control word. In theory, the batch could be extended indefinitely; however, a very slight degradation in pager sensitivity will occur with each extension.

The GSC format allows data pages to be intermixed with tone only or tone and voice pages. A data page consists of a pager address followed by one or more data blocks. A data block is identical in length to an address block and may be freely substituted for addresses in the batch operating mode. The signal call mode can also be used by following the pager address with the data message. Data information is transmitted at 600 BPS to minimize the cross falsing probability between addresses and data.

Referring now to FIG. 1C the normal voice paging format involving a deactivation code of the preferred embodiment is shown on a time sequence basis beginning at the left hand side. A preamble signal is supplied for the purpose of designating a particular segment of the population of receivers. This is followed by a control word which in the preferred system is used for a function unrelated to the present invention. In sequence the address for the first designated pager is transmitted followed by an activation code whose function is to cause the addressed pager to immediately react to the reception of its address. Consistent with the normal alert time for voice systems there is an approximate two second gap during which time the addressed and activated pager provides a beep signal to alert the pager user that a voice message is about to be transmitted. At the conclusion of the alert time the variable length voice message is transmitted and at the conclusion of the variable length voice message the deactivation control word is transmitted to disable the audio channel for the addressed receiver.

The preamble for the next pager address is immediately transmitted followed by the appropriate control word and in sequence the address for the second pager the corresponding activation code. This is followed by the two second alert for the second addressed and activated pager after which time the corresponding voice variable length voice message for that second pager is transmitted. At the conclusion of the variable length message for the second addressed and activated pager there is the positive deactivation control word to shut down the audio operation of only the addressed and activated pager and allow further transmission of information for other pagers.

As may be seen for by comparison of FIGS. 1A, B, and C although the preferred embodiment includes additional signaling words to achieve other purposes the basic construction is identical to FIG. A in which case a variable length voice message is followed by a deactivation control word which in the digital system allows for an immediate shut down of the audio channel and enables the entire message system to be utilized for the transmission of additional addresses and subsequent additional information so as to increase the throughput of the overall message system.

Figure 2:
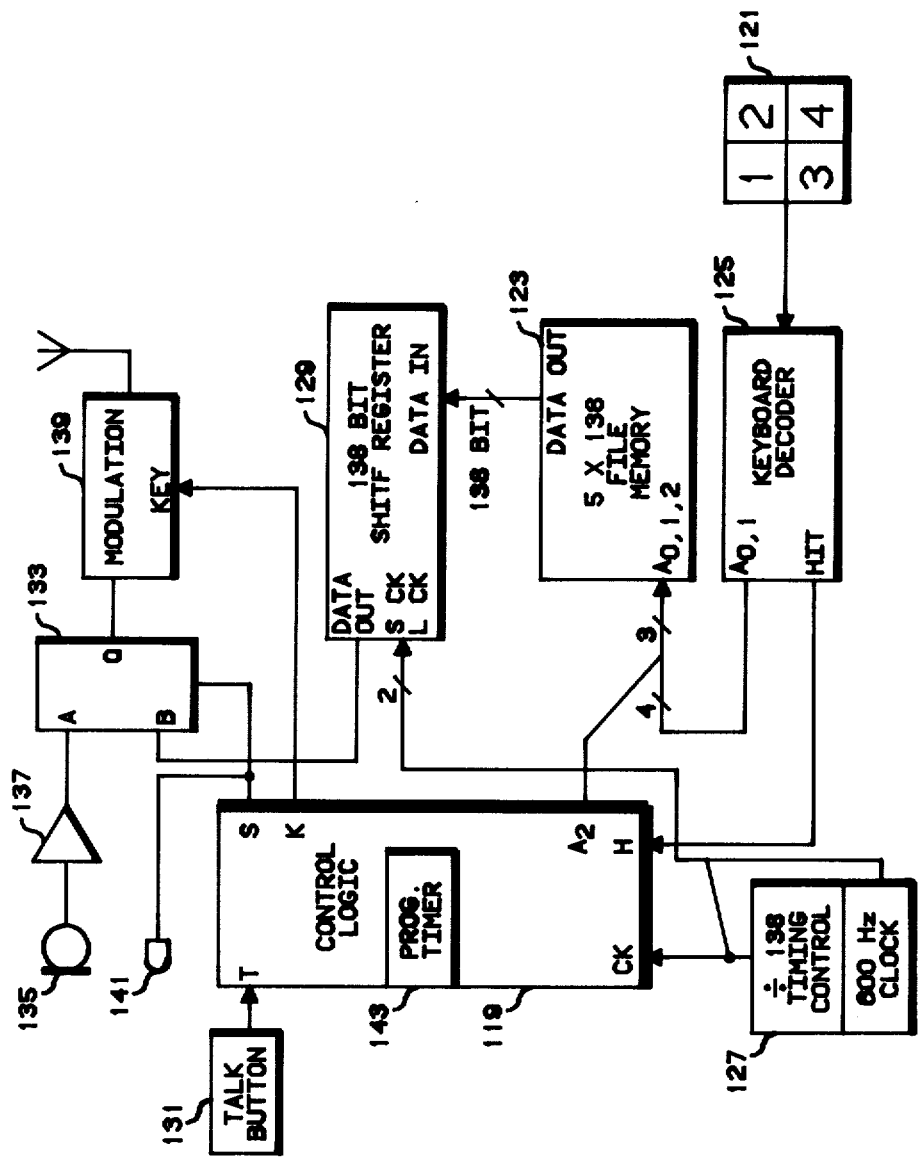
FIG. 2 is a functional block diagram of a hardware embodiment of the present invention.

FIG. 2 is an encoder according to the invention for transmitting a deactivation code to be received by a pager receiver or a similar device. Control logic 119 is preferably a PLA which controls the sequential timing of the encoder. Key pads on a keyboard 121 address file memory 123 through keyboard decoder 125. Four keys are shown on keyboard 121 for purposes of illustration only. The particular number depends on the operator's needs. Keyboard decoder 125 also signals the control logic 119 at its H input when a key pad has been pressed. A time counter 127 provides the timing for both control logic 119 and a shift register 129. Shift register 129 receives parallel data from file memory 123 in accordance with a file memory address $A_0$, $A_1$ and $A_2$ which is correspondingly received from the keyboard decoder 125 ($A_0$, $A_1$) and control logic 119 ($A_2$). A talk light 141 signals to the operator of the encoder that the microphone has been enabled for transmission. When the talk light 141 is lit, the T input of control logic 119 is sensitive to a depression of a talk button 131. In response to a depression of talk button 131, control logic 119 causes a selector 133 to output the signal on selector 133 input A or B. The signal on the A input of selector 133 is a voice audio signal from microphone 135 by way of amplifier 137. The signal on the B input of selector 133 is the serial digital output of shift register 129. The control logic 119 keys the transmitter 139 in the appropriate time sequences as will be more fully explained in connection with FIG. 3. A programmable counter 143 serves to count encoder internal time intervals which will be more particularly described in connection with FIG. 3.

Figure 3:
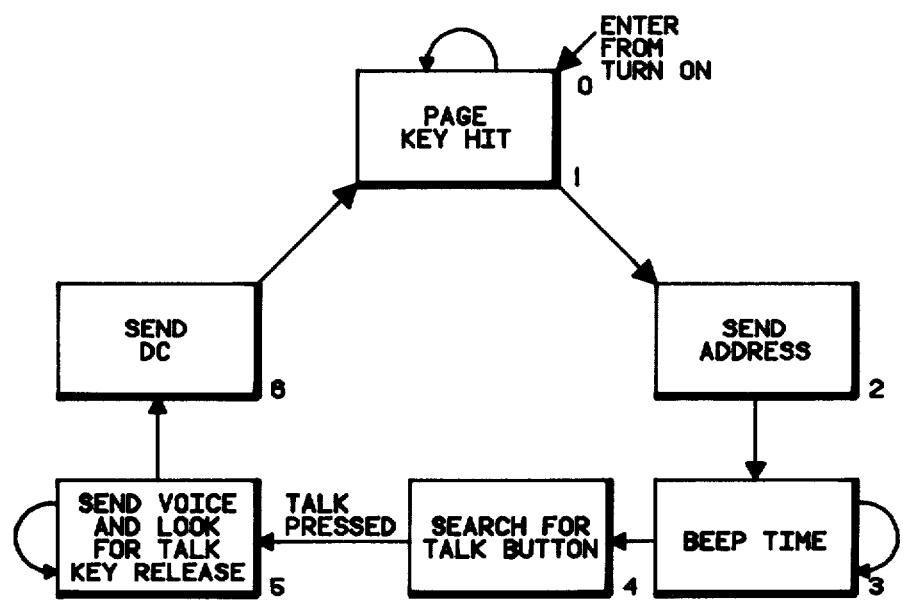
FIG. 3 is a state diagram representing the functions for the diagram of FIG. 2.

FIG. 3 shows the state diagram for the encoder of FIG. 2 transmitting the address of a pager followed by a voice message and a deactivation code. Turning on the encoder of FIG. 2 from an off state (state 0) results in the encoder entering state 1 as shown in FIG. 3. In state 1 the encoder is sensitive to depression of a key pad of keyboard 121. Shift register 129 continuously circulates and loads binary data from file memory 123 as timed by time counter 127, but since there is no transmission in state 1 the data can be arbitrary. Therefore, the state of file memory 123 can also be arbitrary.

Transmitter 139 is keyed off by control logic 119 while selector 133 is selected into the B position by control logic 119 so that talk light 141 is off. Control logic 119 is not monitoring the state of talk button 131 while in state 2. Upon the depression of a key pad on keyboard 121, the keyboard decoder latches onto the key number and keyboard 121 and sends a key detect signal to input H of control logic 119. In response the control logic 119 causes the encoder to move to state 2 shown in FIG. 3. The control logic 119 outputs at $A_2$ a signal to file memory 123 telling the file memory 123 that the outputs $A_0A_1$ from keyboard decoder 125 are an address code for 1 of the 4 pagers (Rather than a deactivation code). The file memory 123, in response to the input $A_0$, $A_1$ and $A_2$, outputs to shift register 129, the appropriate binary address code which corresponds to the pager whose key pad was pressed.

In state 2 shift register 129 loads this address when it next receives a load signal and begins to serially output the address into the B input of selector 133. The control logic 119 selects input B of selector 133. The transmitter 139 is keyed on by the K output by control logic 119. The talk light 144 is out and talk button 141 is inhibited. Automatic cycling time within the control logic 119 moves the state of the encoder from state 2 (send address state) to state 3 (beep time state) as shown in FIG. 3. At the end of transmission of the pager address, the control logic 119 loads the programmable counter 143 with the time duration of the beep that the pager outputs when it receives its proper address.

In state 3 the control logic 119 dekeys or deactivates the transmitter 139 and the keyboard decoder 125 input to H of control logic 119 is inhibited. At the end of the beep time as determined by the timing out of the programmable counter 143, the encoder changes from the beep time state (state 3 of FIG. 3) to the state of searching for the depression of the talk button 131 (state 4).

In state 4 control logic 119 selects input A of selecter 133. Correspondingly talk light 141 will be lit. When talk button 131 is depressed control logic 119 will move the encoder from state 4 to state 5 of FIG. 3.

In state 5 the control logic 119 keys on the transmitter 139 and sets the internal programmable counter 143 to time out a maximum talk length. The control logic 119 monitors the talk button input for its release. The keyboard decoder 125 input to control logic 119, H in FIG. 2, is inhibited. When the talk button 131 is released or when the programmable counter 143 times out the encoder will change from state 5 to state 6.

In state 6 the control logic 119 switches the selector 133 to input B. The control logic 119 addresses the file memory 123 to output the deactivation code. The deactivation code is outputted in a binary address from file memory 123 and parallel loaded into shift register 129 and serially outputted to input B of selector 123. The control logic 119 keys the transmitter 139 and the deactivation code is transmitted. Since the control logic 119 shows input B of selecter 133, the talk light 141 is out. The talk button 131 is inhibited. The internal timing of control logic 119 automatically transfers the state of the encoder from state 6 back to state 1 as shown in FIG. 3 and the cycle is repeated if a key pad of keyboard 121 is pressed again.

Table 1 on the following page is a time sequential logic table of the PLA comprising the control logic 119 in accordance with the invention.

TABLE 1
LOGIC TABLE for PLA

| Inputs | | | | | | | | | Outputs | | | |
|---|---|---|---|---|---|---|---|---|---|---|---|---|
| T | H | Control Timer (φ) | Present State | | | Next State | | | $A_2$ | K | S | Programmable Time Count |
|   |   |   | $Q_2$ | $Q_1$ | $Q_0$ | $D_2$ | $D_1$ | $D_0$ |   |   |   |   |
| X | 0 | X | 0 | 0 | 0 | 0 | 0 | 0 | X | 0 | 0 | X |
| X | 1 | X | 0 | 0 | 0 | 0 | 0 | 1 | 0 | 0 | 0 | X |
| X | X | X | 0 | 0 | 1 | 0 | 1 | 0 | X | 1 | 0 | Beep Time (2S) |
| X | X | 0 | 0 | 1 | 0 | 0 | 1 | 0 | X | 0 | 0 | X |
| X | X | 1 | 0 | 1 | 0 | 0 | 1 | 1 | X | 0 | 0 | X |
| 0 | X | X | 0 | 1 | 1 | 0 | 1 | 1 | X | 0 | X | X |
| 1 | X | X | 0 | 1 | 1 | 1 | 0 | 0 | X | 1 | 1 | Voice Duration (2S) |
| 1 | X | 0 | 1 | 0 | 0 | 1 | 0 | 0 | X | 1 | 1 | X |
| 1 | X | 1 | 1 | 0 | 0 | 1 | 0 | 1 | 1 | 1 | 0 | X |
| 0 | X | 0 | 1 | 0 | 0 | 1 | 0 | 1 | 1 | 1 | 0 | X |
| 0 | X | 1 | 1 | 0 | 0 | 1 | 0 | 1 | 1 | 1 | 0 | X |
| X | X | X | 1 | 0 | 1 | 0 | 0 | 0 | X | 1 | 0 | X |

FIG. 4 shows the functional block diagram of the encoder for the preferred embodiment of the invention in which a microphone 200 is coupled through an audio amplifier 202 to a preemphasis circuit 204 which finally produces an audio signal. This audio signal is supplied to a pair of transmission gates 206 which, as will be described in detail later, allow for the selection of either audio or data information to be transferred to the modulating input of a transmitter 208. An antenna 209 is coupled to transmitter 208. The transmission gates 206 are preferably of the type manufactured by Motorola and designated MC14551. A keyboard 210 is coupled to a CRT 212. This combination is preferably a Lear Siegler Model ADM-3A. The RS232 output of the CRT is coupled to a 6800 base computer 214 which further includes the several additional modules which are: a MEX 6820 I/O module, a 68MM19 6809 monoboard, microcomputer, a MEX6812-1 2K static RAM, and a M68MMCC05 Card Cage for a micro module.

PBO output of computer 214 is coupled to the data input of transmission gate 206, the input of an audio data select circuit 216 and the input of an audio/data detect circuit 218. The output of the audio/data select circuit 218 is coupled to the selection input of the transmission gate 206. A zero logic level at this selection input terminal indicates that the data transmission gate is activated and a 1 level indicates that the audio information gate is activated to supply the corresponding information to the modulating input of transmitter 208.

The output of audio data detect circuit 218 keys the transmitter so that the operation of aduio data detect circuit 218 is similar to an OR function in that if either signal is detected as being present at its input, the transmitter is keyed so that the input signal may be modulated by the RF carrier. The combined signal is supplied to antenna 209 for broadcast.

FIG. 5 shows the detailed circuitry for audio/data detect circuit 218 and audio data select circuit 216. The PBO output of computer 214 is coupled to the input terminal of audio data detector 218 which comprises a retriggerable monostable. The circuit operates to maintain a constant signal output so long as a signal edge is detected within a predetermined time period of every 100 milleseconds. The absence of a detected signal edge during that time period would indicate that neither data nor audio signals were present.

In operation of the audio/data detector circuit 218, the PBO output terminal of computer 214 is coupled directly to a first input of an OR gate 230 and through an inverter 230 to the second input. The output of OR gate 230 is coupled to the trigger input of a monostable 234 which may be implemented using one-half of an IC designated MC14538. A timing network is provided for the monostable and VDD, the source of voltage, is applied to the clear input terminal of monostable 234. The VDD is also applied through a resistor 236 to a timing input of the monostable 234 and through a capacitor 238 connected to ground. The combination of the resistor 236 and capacitor 238 provide a timing circuit for monostable device 234. The Q1 output of monostable 234 is coupled directly to transmitter 208 as shown in FIG. 4 to provide the transmitter keying control signal.

The function of the audio data detector 218 is to receive within every 100 millesecond interval an edge indicating that either a data or an audio signal is present on the line. As each edge is detected in the OR gate, it retriggers monostable 234 for its predetermined time. As long as pulses are received at an interval that is less than the normal time out for the monstable 234, a Q1 output of monostable 234 in audio data detector 218 will remain at a logic level thereby keying the transmitter.

The PBO output of computer 214 is also connected directly to the first input of an OR gate 240 and through an inverter 242 to the second inut of OR gate 240. The first input of OR 240 is coupled to ground. The output of OR gate 240 is coupled to the trigger input of a second retriggerable monostable 244. Monostable 244 is preferably half of the same IC package which was utilized to implement audio/data detector circuit 218. For monostable 244, VDD is applied in the same manner to produce a somewhat different timing characteristic for its operation. This new time is chosen by the value of a resistor 246 and capacitor 248 which are coupled to the timing inputs of monstable 244. VDD is also connected to the clear input terminal of monostable 244. The Q2 terminal of monostable is coupled to the D input terminal of a data flip-flop 250.

The PBO output of computer 214 is also coupled to the clock input of D flip-flop 250. The set input of the data flip-flop 250 is connected to ground. Flip-flop 250 is preferably one-half of an IC designated MC14013. The Q output of flip-flop 250 provides the control signal output of audio/data select circuit 216 which is supplied to transmission gates 206 and causes the selective activation of one of the gates depending upon whether either the audio or data information is to be supplied to the modulating input of the transmitter.

When it is desired to transmit an audio signal, the encoder for the present embodiment is designed to respond to the presence of a 600 Hz signal so that the activation of an external microphone or other voice storage and forwarding device may be achieved to insert the voice message into the transmission at the appropriate time. There are several other reasons for using various square wave signals at predetermined frequencies but with respect to the present invention only the presence of a 600 Hz signal is used for this specific purpose.

Audio data selection circuit 216 operates as a tone detector in which OR gate 240 is triggered on the detection of a squarewave signal edge to produce a relatively long duration output pulse at the Q2 output terminal of monostable 244. This signal is supplied to the D input of the flip-flop which is also coupled directly to the PBO output of computer 214 through its clock terminal. If the long duration pulse from the monostable continues during the time that a subsequent squarewave signal edge is detected from the PBO output of the computer, data flip-flop 250 is either maintained at or is toggled to the 1 logic level output at its Q terminal. This indicates detection of the 600 Hz signal. Termination of the long duration pulse from the monostable before an edge occurs at the clock terminal of the data flip-flop would cause it to toggle to zero or maintain it at zero thus indicating that no 600 Hz audio signal had been selected and therefore no audio signal was to be transmitted.

FIG. 6 represents the flowchart for the firmware operation of the encoder shown in FIGS. 4 and 5. When the encoder is activated, it goes through an initialization routine in which all registers are set so that the program can be loaded and executed. After initialization, control is transferred to a decision block at which time the operator selects the control mode. There are three possible control modes; first is the selection of multiple queue transmissions; the second is the selection of single queue transmissions; and most importantly the third is the selection for the block number and type of information to be transmitted.

The block number allows the operator to select in a given message sequence exactly where information is to be inserted. The type of information refers directly to the coding system utilized and allows the operator to select the preamble number and the duration of the preamble signal and to select the first and second address words for the echo coding system of the preferred embodiment. Completion of this operation establishes the addresses of the pagers which can be paged. In normal operation, subscriber addresses would be maintained in a memory file status so that individual pagers could be correctly addressed.

The next operator choice is the selection of whether or not to specify numeric data information which produces a block of numeric data suitable for transmission to a numeric or data pager. The last operator selection is a frequency signal which for the preferred GSC coding embodiment is indicative of a tone and voice operation for pagers. This has already been described in detail.

At the conclusion of the selection of the four types of information, control is transferred to a decision block to determine whether or not all of the selections are completed. If not, the control of the operation is again returned to the select block of number and type operation at which time additional locations for blocks of information may be selected and additional types designated. The selection of the block number and type of information and whether or not the message is to be data tone only or tone and voice would be made for each block of information. After all of the decisions are made and the operator is finished with the block selection, control of the operation is returned to the select mode decision block at which time the operator can choose among the three possible mode operations including adding additional information to the assemblage of blocks and information.

The selection of multiple queue transmissions or single queue transmissions enable information of the designated blocks in sequences of information to be sent singly, that is in one transmission, or to be repeated a number of times. Normally, only the single queue transmission would be used, however for the purpose of sending extremely long messages, the use of a redundancy can be built in to ensure even greater reliability of the reception of long complex messages.

At the conclusion of the select queue operation for the transmission, control is transferred to the transmit decision block. If at this time the operator elects no transmission, operation of the program is again returned to the select control mode. If the operator chooses to transmit, control is transferred to the start timer operation.

The start timer operation takes the blocks of information and formats them into various transmission patterns. At regular intervals of 1200 times per second, the information storage buffers in which the information has been formatted are accessed by a timer interrupt routine which takes the output of a given buffer and provides one bit of information to a sequence control operation so that the transmission pattern may be sent out one bit at a time. At the end of each interruption, control of the program returns to the formatting operation at which time additional information may be loaded into the buffers.

In operation the format control takes the blocks of information as designated and selected and loads them into temporary storage buffers so that they may be emptied on a time interrupt bit by bit basis and provided to the transmitter. The output from the transmitter is digital logic signals superimposed on a carrier at the rate of 1200 bits per second.

As the various information storage buffers are emptied on a bit by bit basis, the formatting routine continues to load the additional selected information. The buffers may be drained serially to produce the message sequence. At the end of the information in the last stored buffer, the decision to end transmission is made. If it is not the end of the transmission, control is returned to the formatting block so that additional transmission patterns may be loaded into the information storage buffers so that they may be accessed to provide the information for the transmission. If the decision from the end of the transmission decision block is to stop, then a stop timer routine is activated at which time control is transferred back to the select control mode operation.

Included with this primary flowchart is a separate secondary flowchart for the timer interrupt routine which on a regular 1200 times per second basis interrogates the information sequence stored in the storage buffers and provides an output to the transmitter. At the conclusion of the transfer of each bit of information control of the operation is transferred back to the formatting operation in the primary flowchart.

Table 2 shows the hexadecimal core dump of the entire firmware coding program consistent with the language appropriate for the computer shown in FIG. 4. Loading of this code into the ROM will provide the operation described by the flowchart in FIG. 6.

TABLE 2

```
3000 8E F0 83 BD D4 A7 8E 00 00 A6 0A 81 30 27 03 BD
3010 D4 B4 A6 0B BD D4 B4 86 2E BD D4 B4 9E 11 A6 84
3020 84 F0 81 F0 27 09 8E F0 6B BD D4 A7 7E D3 93 9E
3030 11 A6 84 84 0F 1F 89 4D 48 34 04 AB E0 8E D0 54
3040 9F 18 D6 19 34 04 AB E0 97 19 D6 19 C9 00 D7 18
3050 9E 18 6E 84 7E D1 4C 7E D0 84 7E D1 C0 7E D1 FB
3060 7E D0 D0 7E D2 61 7E D2 A7 7E D2 CB 7E D2 E2 7E
3070 D3 14 7E D0 26 7E D0 26 7E D0 26 7E D0 26 7E D0
3080 26 7E D0 26 8E F0 89 BD D4 A7 9E 11 A6 02 BD D4
3090 B4 A6 03 BD D4 B4 A6 04 BD D4 B4 A6 05 BD D4 B4
30A0 A6 06 BD D4 B4 A6 07 BD D4 B4 86 2E BD D4 B4 A6
30B0 01 85 01 26 0A 9E 11 A6 01 85 02 26 0A 20 0E 8E
30C0 F0 A1 BD D4 A7 20 EE 8E F0 C0 BD D4 A7 7E D3 93
30D0 8E F0 E2 BD D4 A7 9E 11 A6 02 84 0F 81 01 27 11
30E0 81 02 27 12 81 04 27 13 81 08 27 14 8E F1 11 20
30F0 12 8E F0 F6 20 0D 8E F0 FD 20 08 8E F1 04 20 03
3100 8E F1 0B BD D4 A7 8E F1 19 BD D4 A7 8E F1 25 BD
3110 D4 A7 9E 11 A6 01 BD D4 B4 86 2E BD D4 B4 8E F1
3120 3E BD D4 A7 BD D1 30 8E F1 54 BD D4 A7 7E D3 93
3130 9E 11 A6 03 BD D4 B4 A6 04 BD D4 B4 A6 05 BD D4
3140 B4 A6 06 BD D4 B4 A6 07 BD D4 B4 39 8E F1 5E BD
3150 D4 A7 9E 11 A6 02 BD D4 B4 A6 03 BD D4 B4 A6 03
3160 85 01 26 07 86 2E BD D4 B4 20 06 8E F1 6C BD D4
3170 A7 9E 11 A6 01 85 01 27 06 8E F1 77 BD D4 A7 8E
3180 F1 8C BD D4 A7 9E 11 A6 03 85 01 26 2A A6 07 BD
3190 D4 B4 9E 11 A6 06 85 02 26 07 86 2E BD D4 B4 20
31A0 06 8E F1 6C BD D4 A7 9E 11 A6 01 85 02 27 0E 8E
31B0 F1 77 BD D4 A7 20 06 8E F1 9C BD D4 A7 7E D3 93
31C0 8E F1 A2 BD D4 A7 9E 11 86 06 97 1A A6 02 BD D3
31D0 3A 30 01 0A 1A 26 F5 86 2E BD D4 B4 9E 11 A6 01
31E0 85 04 27 06 8E F1 B6 BD D4 A7 9E 11 A6 01 85 01
31F0 27 06 8E F1 77 BD D4 A7 7E D3 93 8E F1 DB BD D4
3200 A7 8E F1 A6 BD D4 A7 8E 00 1B 9F 21 9E 11 9F 23
3210 9E 23 A6 02 30 01 9F 23 9E 21 A7 84 30 01 9F 21
3220 8C 00 21 26 EB C6 08 8E 00 1B 4F 69 84 49 30 01
3230 8C 00 21 26 F6 8B 20 BD D4 B4 5A 2E EA 86 2E BD
3240 D4 B4 9E 11 A6 01 85 04 27 06 8E F1 B6 BD D4 A7
3250 9E 11 A6 01 85 01 27 06 8E F1 77 BD D4 A7 7E D3
3260 93 8E F1 E6 BD D4 A7 8E F2 02 BD D4 A7 9E 11 6D
3270 01 27 11 86 24 BD D4 B4 A6 01 BD D3 3A 86 2E BD
3280 D4 B4 20 06 8E F1 9C BD D4 A7 8E F1 3E BD D4 A7
3290 9E 11 C6 05 A6 03 BD D4 B4 30 01 5A 2E F6 8E F1
32A0 54 BD D4 A7 7E D3 93 8E F2 13 BD D4 A7 9E 11 A6
32B0 01 BD D4 B4 86 2E BD D4 B4 8E F1 3E BD D4 A7 BD
32C0 D1 30 8E F1 54 BD D4 A7 7E D3 93 8E F2 26 BD D4
32D0 A7 8E F1 3E BD D4 A7 BD D3 81 86 2E BD D4 B4 7E
32E0 D3 93 8E F2 39 BD D4 A7 9E 11 A6 03 BD D4 B4 8E
32F0 F1 6C BD D4 A7 8E F2 4F BD D4 A7 BD D3 81 86 2E
3300 BD D4 B4 9E 11 A6 01 85 01 27 06 8E F2 7A BD D4
3310 A7 7E D3 93 8E F2 A5 BD D4 A7 9E 11 A6 04 BD D4
```

```
3320 B4 BD D3 81 86 2E BD D4 B4 9F 11 A6 01 85 01 27
3330 05 8E F1 77 BD D4 A7 7E D3 93 34 02 84 0F BD D3
3340 4B 35 02 44 44 44 44 BD D3 4B 39 81 0D 27 18 81
3350 0E 27 18 81 0A 27 18 81 0B 27 18 81 00 27 18 81
3360 0C 27 18 8A 30 20 16 86 20 20 12 86 2D 20 0E 86
3370 30 20 0A 86 2F 20 06 86 45 20 02 86 00 BD D4 B4
3380 39 9E 11 A6 05 BD D4 B4 A6 06 BD D4 B4 A6 07 BD
3390 D4 B4 39 BD D5 31 39 8E 00 84 6F 84 30 01 8C 01
33A0 6B 26 F7 8E 00 90 9F 9C 9F 9E 86 0F 97 9B 8E DE
33B0 D4 9F A0 86 98 97 7F 4C 97 7E 97 7D 7F EC 18 B6
33C0 EC 19 BE EC 1C 12 1C FF 96 80 9A 81 9A 82 26 15
33D0 96 90 9A 91 9A 92 9A 93 26 F6 12 1A 10 86 01 B7
33E0 EC 18 7E D5 31 8E 00 03 1A 01 A6 89 00 7F A9 89
33F0 00 7C 19 A7 89 00 7F 30 1F 26 EF 8E E2 00 9F 11
3400 9E 11 A6 84 84 F0 81 F0 26 BE A6 84 8E D4 24 9F
3410 86 84 0F 48 9B 87 97 87 96 86 89 00 97 86 9E 86
3420 AE 84 5E 84 D4 38 DC 01 D9 69 D4 38 D7 9F D4 38
3430 D4 38 D4 38 D7 3A D4 38 96 12 8B 08 97 12 96 11
3440 89 00 97 11 7E D4 00 12 1A 10 10 CE E1 FF 8E DE
3450 6A BF FF F8 86 03 B7 90 02 86 04 B7 90 03 86 C1
3460 B7 EC 19 8E 00 07 BF EC 1C 86 03 B7 EC 14 86 91
3470 B7 EC 14 86 00 97 83 8E F8 34 9F 0C AE 84 AD 84
3480 20 FA B6 EC 14 47 24 FA B6 EC 15 84 7F 34 04 F6
3490 EC 14 57 57 24 F9 B7 EC 15 35 04 39 BD D5 31 AE
34A0 84 8D 04 BD D5 31 39 A6 84 81 04 27 06 8D 05 30
34B0 01 20 F4 39 D6 83 C5 40 27 1E 34 02 81 0A 27 09
34C0 86 00 BD D4 8D 35 02 20 0F 86 32 97 17 86 00 BD
34D0 D4 8D 0A 17 26 F9 35 02 BD D4 8D 39 BD D5 31 9F
34E0 15 BD D5 31 E6 84 C1 04 27 1B BD D4 82 97 0E C1
34F0 01 27 21 34 04 A1 E0 27 14 30 01 30 01 30 01 E6
3500 84 C1 04 26 EE 9E 15 BD D5 3A 39 20 E6 BD D5 35
3510 BD D5 3A 39 30 01 A1 84 25 0F 30 01 A1 84 22 D9
3520 9F 0C BD D5 2D BD D5 3A 39 30 01 20 CC 9E 0C 20
3530 04 9E 0C 30 01 30 01 9F 0C 39 AE 84 9F 0C 39 9E
3540 0C A6 09 34 02 A6 08 34 02 A6 07 34 02 A6 06 34
3550 02 A6 05 34 02 A6 04 34 02 30 01 30 01 BD D5 3A
3560 7E D4 7C 1F 41 AE 02 20 0A 1F 41 AE 04 20 04 1F
3570 41 AE 06 32 61 32 61 32 61 32 61 32 61 32 61 32
3580 61 32 61 9F 0C 39 8E 00 73 6F 84 30 01 8C 00 7B
3590 26 F7 7E D5 31 BE D5 9D 9F 25 7E D5 31 31 38 8E
35A0 00 73 86 F0 A7 84 96 25 A7 02 BD D4 B4 96 26 A7
35B0 03 BD D4 B4 BD D5 31 85 01 27 03 7E D5 3A 7E D5
35C0 31 86 F1 97 73 7E D5 31 8E 00 73 A6 01 8A 01 A7
35D0 01 7E D5 31 8E 00 73 A6 01 8A 02 A7 01 7E D5 31
35E0 8E 00 73 A6 06 8A 02 A7 06 7E D5 31 BD D5 31 A6
35F0 84 1F 89 4D BD D5 2D AB 84 8E 00 72 9F 71 99 72
3600 97 72 96 71 89 00 97 71 8E 00 0B 9F 7B 9E 7B A6
3610 84 30 1F 9F 7B 9E 71 A7 84 30 1F 9F 71 5A 2E ED
3620 7E D5 2D 9E 11 9F 23 8E 00 73 9F 71 C6 08 9E 71
3630 A6 84 30 01 9F 71 9E 23 A7 84 30 01 9F 23 5A 2E
3640 ED 7E D5 31 8E 00 73 86 04 AA 01 A7 01 7E D5 31
3650 8E 00 00 9F 7B 8E 00 73 9F 71 CF 1A C6 0C 9E 7B
3660 A6 84 5A 30 01 9F 7B 81 00 26 04 0C 1A 20 EF 81
3670 20 26 04 86 0D 20 22 81 2D 26 04 86 0E 20 1A 81
3680 30 26 04 86 0A 20 12 81 2F 26 04 86 0B 20 0A 81
```

```
3690  45 26 04 86 00 20 02 84 0F 9E 71 34 04 D0 1A C5
36A0  01 27 04 A7 02 20 0C 48 48 48 48 AA 02 A7 02 30
36B0  01 9F 71 35 04 5D 2E A6 D6 1A 5A C5 01 27 06 86
36C0  0C A7 02 20 08 86 C0 AA 02 A7 02 30 01 5D 2E EA
36D0  7E D5 31 86 F2 97 73 7E D5 31 8E 00 04 9F 7B A6
36E0  84 27 02 80 20 30 01 9F 7B 8E 00 75 48 48 49 69
36F0  84 30 01 8C 00 7B 26 F6 9E 7B 8C 00 0C 26 E0 7E
3700  D5 31 86 F3 97 73 7E D5 31 BD D5 31 A6 84 97 75
3710  7E D5 2D 86 F4 97 73 7E D5 31 96 0E 97 74 7E D5
3720  31 86 F8 97 73 7E D5 31 96 0E 97 76 7E D5 31 0F
3730  80 0F 81 86 01 97 82 7E D5 31 BD DC 28 8D 16 8D
3740  35 BD DD D1 BD DC D4 0A 1A 27 05 BD DC 28 20 F1
3750  0F 85 7E D4 38 9E 11 A6 03 84 0F 48 8E D7 8B 9F
3760  86 9B 87 97 87 96 86 89 00 97 86 9E 86 A6 84 97
3770  B0 A6 01 97 B4 39 9E 11 A6 06 84 0F BD D8 93 48
3780  E6 07 C4 0F 34 04 AB E0 97 1A 39 77 E0 88 10 E4
3790  10 70 A0 FD 00 CF 30 F1 70 37 90 18 60 98 80 BD
37A0  DC 28 8D 05 0F 85 7E D4 38 9E 11 86 40 E6 01 C5
37B0  01 27 02 8A 80 E6 02 C4 0F 34 04 AB E0 9E 9E A7
37C0  84 8E 00 B0 6F 84 30 01 8C 00 C0 26 F7 9E 11 A6
37D0  04 84 0F 8E 00 B0 A7 05 30 01 BD DD AB BD DD AB
37E0  BD DD AB 9E 11 A6 05 84 0F 8E 00 B0 A7 04 BD DD
37F0  AB BD DD AB BD DD 9E 9E 11 A6 06 84 0F 8E 00 B0
3800  A7 04 6F 84 BD DD AB BD DD 9E 9E 11 A6 07 84 0F
3810  8E 00 B0 AB 05 A7 05 A6 01 89 00 A7 01 9E 9E 96
3820  B1 A7 04 96 B5 A7 08 39 8E 00 0C C6 0C 86 00 30
3830  1F A7 84 5A 2E F9 BD D5 31 39 96 0E 81 0D 27 12
3840  8E 00 00 A6 01 A7 84 30 01 8C 00 0B 26 F5 96 0E
3850  97 0B BD D5 31 39 4F 97 0F 97 10 8E 00 00 A6 09
3860  81 00 26 08 A6 0A 81 00 26 0E 27 15 80 30 8D 23
3870  8D 21 48 48 97 10 A6 0A 80 30 8D 17 48 9B 10 97
3880  10 A6 0B 80 30 99 10 97 10 96 0F 89 00 97 0F BD
3890  D5 31 39 1F 89 4D 48 48 34 04 AB E0 39 8E E2 00
38A0  86 F4 A7 84 30 01 86 30 A7 84 30 01 86 32 A7 84
38B0  30 01 86 00 A7 84 30 01 A7 84 30 01 86 32 A7 84
38C0  30 01 86 34 A7 84 30 01 86 32 A7 84 30 01 8C E5
38D0  20 26 CD 8E E2 00 9F 11 9F 13 6F 84 BD D5 31 39
38E0  96 10 D6 0F 48 48 59 48 59 8B 00 97 12 C9 E2 D7
38F0  11 BD D5 31 39 96 13 91 11 22 36 25 06 96 14 91
3900  12 22 2E 86 F4 9E 13 A7 84 86 30 A7 01 86 32 A7
3910  02 86 00 A7 03 A7 04 86 32 A7 05 A7 07 86 34 A7
3920  06 96 12 8B 08 97 14 96 11 89 00 97 13 9E 13 6F
3930  84 BD D5 31 39 0F 80 0F 81 0F 82 7E D5 31 8E 00
3940  06 8D 15 97 80 30 01 30 01 8D 0D 97 81 30 01 30
3950  01 8D 05 97 82 7E D5 31 A6 84 84 0F E6 01 C4 0F
3960  48 48 48 48 34 04 AB E0 39 BD DC 28 BD D9 8C BD
3970  DA 08 BD DA 8D BD DA A6 BD DA DF BD D9 C7 BD DC
3980  28 BD D9 DC BD DB 74 0F 85 7E D4 38 7F 01 60 8E
3990  01 54 BF 01 50 9E 11 30 01 BF 01 52 A6 84 81 04
39A0  26 05 86 40 B7 01 60 BE 01 52 A6 01 BE 01 50 A7
39B0  84 30 01 8C 01 5A 27 0E BF 01 50 BE 01 52 30 01
39C0  BF 01 52 7E D9 A7 39 86 42 0D B0 2B 02 8A 80 9E
39D0  9E A7 84 86 02 9B 85 A7 08 6F 04 39 8E 00 B0 BF
39E0  01 40 9E 88 BF 01 42 BE 01 40 A6 84 BE 01 42 A7
```

```
39F0  84 A7 01 7C 01 41 BE 01 40 8C 00 BF 27 09 7C 01
3A00  43 7C 01 43 7E D9 E7 39 8E 01 5A 6F 84 30 01 8C
3A10  01 60 26 F7 30 01 6F 84 8E 01 54 A6 84 A7 06 48
3A20  69 07 30 01 A6 84 48 69 07 AB 06 A7 06 48 69 07
3A30  30 01 A6 84 48 69 07 48 69 07 AB 06 A7 06 48 69
3A40  07 30 01 A6 84 48 48 48 AB 06 A7 06 8E 01 59 A6
3A50  84 44 66 06 44 66 06 66 06 AB 07 A7 07 30 1F A6
3A60  84 44 66 06 44 66 06 44 66 06 66 06 AB 07 A7 07
3A70  30 1F A6 84 44 44 44 44 AB 07 A7 07 8E 01 5A A6
3A80  84 84 7F A7 84 30 01 8C 01 5E 26 F3 39 5F 4F 8E
3A90  01 5B A6 84 BB 01 5A 30 01 AB 84 5C C1 06 26 F7
3AA0  84 7F B7 01 61 39 8E 01 5A BF 01 46 7F 01 48 7F
3AB0  01 49 5F 8E DB 81 BF 01 48 BF 01 46 A6 84 BB 01
3AC0  49 B7 01 49 F9 01 48 F7 01 48 BE 01 48 A6 84 BE
3AD0  01 46 A7 08 30 01 BF 01 46 8C 01 6A 26 D4 39 8E
3AE0  00 B0 6F 84 30 01 8C 00 BF 26 F7 8E 00 B0 BF 01
3AF0  4A C6 01 F7 01 4C 8E 01 5A C6 80 F7 01 4D A6 84
3B00  B4 01 4C 27 10 BF 01 4E BE 01 4A F6 01 4D EB 84
3B10  E7 84 BE 01 4E 30 01 74 01 4D 7D 01 4D 26 DF 7D
3B20  01 4C 2B 0E BE 01 4A 30 01 BF 01 4A 78 01 4C 7E
3B30  DA F6 86 01 B7 01 4C 8E 01 62 86 80 B7 01 4D A6
3B40  84 B4 01 4C 27 10 BF 01 4E BE 01 4A F6 01 4D EB
3B50  84 E7 84 BE 01 4E 30 01 74 01 4D 7D 01 4D 26 DF
3B60  7D 01 4C 2B 0E BE 01 4A 30 01 BF 01 4A 78 01 4C
3B70  7E DB 37 39 86 20 9E 9E A7 84 86 F0 A7 08 6F 04
3B80  39 00 17 2E 39 5C 4B 72 65 B8 AF 96 81 E4 F3 CA
3B90  DD 67 70 49 5E 3B 2C 15 02 DF C8 F1 E6 83 94 AD
3BA0  BA CE D9 E0 F7 92 85 BC AB 76 61 58 4F 2A 3D 04
3BB0  13 A9 BE 87 90 F5 E2 DB CC 11 06 3F 28 4D 5A 63
3BC0  74 8B 9C A5 B2 D7 C0 F9 EE 33 24 1D 0A 6F 78 41
3BD0  56 EC FB C2 D5 B0 A7 9E 89 54 43 7A 6D 08 1F 26
3BE0  31 45 52 6B 7C 19 0E 37 20 FD EA D3 C4 A1 B6 8F
3BF0  98 22 35 0C 1B 7E 69 50 47 9A 8D B4 A3 C6 D1 E8
3C00  FF 8D 25 BD DC 57 BD DC 8D 8D 1D BD DC A6 BD DC
3C10  D4 8D 15 BD DD 1D BD DD BE 8D 0D BD DD D1 BD DC
3C20  D4 85 00 97 85 7E D4 38 9E 9F 30 01 8C 00 94 26
3C30  C3 8E 00 90 9F 9E 8E 00 C0 9F 88 96 9F 80 90 48
3C40  48 48 48 48 93 89 97 89 96 88 89 00 97 88 9E 9E
3C50  A6 04 AA 08 26 FA 39 9E 11 A6 04 84 0F BD D8 93
3C60  48 E6 05 C4 0F 34 04 AB E0 1F 89 4D 54 24 05 C6
3C70  80 DA 83 20 04 C6 7F D4 83 D7 83 8E DE 06 9F 8E
3C80  84 FE 9B 8F 97 8F 96 8E 89 00 97 8E 39 86 42 9E
3C90  8E E6 84 D8 83 2A 02 8A 60 9E 9E A7 84 86 38 9B
3CA0  85 A7 08 6F 04 39 86 10 9E 9E A7 84 86 5C A7 08
3CB0  6F 04 9E 8E A6 84 9E 88 0D 83 2A 01 43 A7 84 A7
3CC0  01 9E 8E A6 01 9E 88 0D 83 2A 02 88 F0 A7 04 A7
3CD0  05 6F 09 39 C6 0C 8E DD EE 9F 86 9E 88 68 04 69
3CE0  84 24 14 9E 86 A6 84 9F 88 A8 05 A7 05 9E 86 A6
3CF0  01 9E 88 A8 09 A7 09 9E 86 30 01 30 01 9F 86 5A
3D00  2E D9 9E 88 A6 01 A7 84 A7 02 A7 03 A6 05 A7 04
3D10  A7 06 A7 07 A6 09 A7 08 A7 0A A7 0B 39 8E 00 B0
3D20  6F 84 30 01 8C 00 C0 26 F7 9E 11 A6 02 84 0F 8E
3D30  00 B0 A7 05 30 01 BD DD AB BD DD AB BD DD AB 9E
3D40  11 A6 03 84 0F 8E 00 B0 A7 04 8D 5F 8D 5D 8D 4E
```

```
3D50  9E 11 A6 06 84 0F 8E 00 B0 A7 04 6F 84 8D 4C 8D
3D60  3D 9E 11 A6 07 84 0F 8E 00 B0 AB 05 A7 05 A6 01
3D70  89 00 A7 01 68 05 69 01 68 05 69 01 68 05 69 01
3D80  A6 05 85 08 27 04 63 01 88 F0 84 F0 A7 05 C6 0C
3D90  6F 84 69 05 69 01 66 84 66 04 5A 2E F5 39 A6 04
3DA0  AB 05 A7 05 A6 04 A9 01 A7 01 39 A6 04 E6 84 48
3DB0  59 48 59 AB 04 E9 84 48 59 A7 04 E7 84 39 86 42
3DC0  0D B0 2B 02 8A 80 9E 9E A7 84 86 02 A7 08 6F 04
3DD0  39 9E 9E 86 10 A7 84 86 5C A7 08 6F 04 9E 88 95
3DE0  B0 A7 84 A7 01 96 B4 A7 04 A7 05 6F 09 39 0A E2
3DF0  7F 92 0D 2A 0C 76 0C D8 26 6C 03 36 0B 72 05 BC
3E00  02 DE 0B 8C 05 C6 93 40 C0 50 11 D0 D6 A0 54 60
3E10  35 60 5A 50 CB 60 28 50 06 A0 21 50 1D 40 C1 60
3E20  1B 70 07 B0 06 B0 16 A0 D0 70 36 C0 2C 30 B7 10
3E30  0C 50 C1 C0 26 70 9C 30 32 10 E0 A0 1C 50 F6 60
3E40  09 30 EE 80 0B 20 10 D0 0C E0 19 80 EC 30 DC B0
3E50  4E C0 31 B0 C3 30 E4 60 E1 B0 0A 30 30 50 27 20
3E60  04 50 08 60 C2 C0 05 A0 05 00 B6 90 02 84 FE 8A
3E70  02 D6 84 C4 01 34 04 AB E0 D6 83 C5 20 27 02 88
3E80  01 B7 90 02 F6 EC 19 BE EC 1C 9E 9C E6 08 C0 01
3E90  E7 08 E5 04 C2 00 E7 04 84 FD B7 90 02 EA 08 27
3EA0  07 9E A3 AE 88 10 6E 84 86 00 A7 84 30 01 8C 00
3EB0  94 26 03 8E 00 90 9F 9C A6 84 84 70 44 44 44 8E
3EC0  DE D4 9F A0 9B A1 97 A1 96 A0 89 00 97 A0 9E A0
3ED0  AE 84 6E 84 DE F4 DE F5 DF 14 DF 14 DF 37 00 00
3EE0  00 00 00 00 DE F4 DF 4B DF 69 DF 69 DF 99 00 00
3EF0  00 00 00 00 3B 8F 00 C0 9F 8A 96 9D 80 90 48 48
3F00  48 48 48 9B 8B 97 8B 97 8D 96 8A 89 00 97 8A 97
3F10  8C 7E DE A1 8F 00 C0 9F 8A 96 9D 80 90 48 48 48
3F20  48 48 9B 8B 97 8B 96 8A 89 00 97 8A 86 80 B7 01
3F30  44 7F 01 45 7E DE A1 9E 9C A6 84 84 0F 97 A2 97
3F40  A3 A6 84 84 80 40 09 84 7E DE A1 9E 8A 68 08 69
3F50  04 69 84 09 84 30 01 96 8D 8B 04 D6 8B 5C 34 04
3F60  A1 E0 26 02 9E 8C 9F 8A 3B 9E 8A 7D 01 44 2B 0C
3F70  68 01 09 84 86 80 B7 01 44 7E DF 83 68 84 09 84
3F80  7F 01 44 7C 01 45 B6 01 45 81 10 26 0B 7F 01 45
3F90  9E 8A 30 01 30 01 9F 8A 3B 0D A3 26 06 96 A2 97
3FA0  A3 03 84 0A A3 3B 00 00 00 00 00 00 00 00 00 00
3FB0  00 00 00 00 00 00 00 00 00 00 00 00 00 00 00 00
3FC0  00 00 00 00 00 00 00 00 00 00 00 00 00 00 00 00
3FD0  00 00 00 00 00 00 00 00 00 00 00 00 00 00 00 00
3FE0  00 00 00 00 00 00 00 00 00 00 00 00 00 00 00 00
3FF0  00 00 00 00 00 00 00 00 00 00 00 00 00 00 00 00
4000  00 00 00 00 00 00 00 00 00 00 00 00 00 00 00 00
4010  00 00 00 00 00 00 00 00 00 00 00 00 00 00 00 00
4020  00 00 00 00 00 00 00 00 00 00 00 00 00 00 00 00
4030  00 00 00 00 00 00 00 00 00 00 00 00 00 00 00 00
4040  00 00 00 00 00 00 00 00 00 00 00 00 00 00 00 00
4050  00 00 00 00 00 00 00 00 00 00 00 00 00 00 00 00
4060  00 00 00 00 00 00 00 00 00 00 00 00 00 00 00 00
4070  00 00 00 00 00 00 00 00 00 00 00 00 00 00 00 00
4080  00 00 00 00 00 00 00 00 00 00 00 00 00 00 00 00
4090  00 00 00 00 00 00 00 00 00 00 00 00 00 00 00 00
40A0  00 00 00 00 00 00 00 00 00 00 00 00 00 00 00 00
```

```
40B0 00 00 00 00 00 00 00 00 00 00 00 00 00 00 00 00
40C0 00 00 00 00 00 00 00 00 00 00 00 00 00 00 00 00
40D0 00 00 00 00 00 00 00 00 00 00 00 00 00 00 00 00
40E0 00 00 00 00 00 00 00 00 00 00 00 00 00 00 00 00
40F0 00 00 00 00 00 00 00 00 00 00 00 00 00 00 00 00
4100 00 00 00 00 00 00 00 00 00 00 00 00 00 00 00 00
4110 00 00 00 00 00 00 00 00 00 00 00 00 00 00 00 00
5000 0D 0A 0A 0A 45 43 48 4F 20 54 45 53 54 20 45 4E
5010 43 4F 44 45 52 0D 0A 4D 4F 54 4F 52 4F 4C 41 20
5020 20 20 4A 41 4E 20 31 39 38 31 04 0D 0A 0A 55 4E
5030 46 4F 52 4D 41 54 54 45 44 20 53 59 53 54 45 4D
5040 2E 04 0D 0A 0A 45 4E 54 45 52 20 41 20 42 4C 4F
5050 43 4B 20 50 4F 53 49 54 49 4F 4E 20 46 52 4F 4D
5060 20 30 20 54 4F 20 39 39 3A 20 04 0D 0A 20 20 42
5070 4C 4F 43 4B 20 55 4E 44 45 46 49 4E 45 44 2E 04
5080 0D 0A 42 4C 4F 43 4B 20 04 0D 0A 20 20 41 44 44
5090 52 45 53 53 20 43 41 50 20 43 4F 44 45 20 3D 20
50A0 04 0D 0A 20 20 45 52 52 4F 52 53 20 49 4E 43 4C
50B0 55 44 45 44 20 49 4E 20 57 4F 52 44 20 31 2E 04
50C0 0D 0A 20 20 45 52 52 4F 52 53 20 49 4E 43 4C 55
50D0 44 45 44 20 49 4E 20 57 4F 52 44 20 32 2E 04 0D
50E0 0A 04 0D 0A 20 20 53 51 55 41 52 45 20 57 41 56
50F0 45 20 4F 46 20 04 36 30 30 20 48 5A 04 33 30 30
5100 20 48 5A 04 31 35 30 20 48 5A 04 37 35 20 48 5A
5110 04 49 4C 4C 45 47 41 4C 04 20 46 52 45 51 55 45
5120 4E 43 59 2E 04 0D 0A 20 20 53 54 41 52 54 49 4E
5130 47 20 50 4F 4C 41 52 49 54 59 20 3D 20 04 0D 0A
5140 20 20 42 4C 4F 43 4B 20 44 55 52 41 54 49 4F 4E
5150 20 3D 20 24 20 53 41 4D 50 4C 45 53 2E 04 0D 0A
5160 20 20 53 59 4E 43 20 3D 20 04 20 20 20 49 4E 56
5170 45 52 54 45 44 2E 04 0D 0A 20 20 45 52 52 4F 52
5180 53 20 49 4E 43 4C 55 44 45 44 2E 04 0D 0A 20 20
5190 47 52 4F 55 50 20 49 44 20 3D 20 04 4E 4F 4E 45
51A0 2E 04 0D 0A 20 20 4E 55 4D 45 52 49 43 20 44 41
51B0 54 41 20 3D 20 04 0D 0A 20 20 4D 45 53 53 41 47
51C0 45 20 43 4F 4E 54 49 4E 55 45 44 20 49 4E 20 4E
51D0 45 58 54 20 42 4C 4F 43 4B 2E 04 0D 0A 20 20 41
51E0 4C 50 48 41 2D 04 0D 0A 20 20 50 53 45 55 44 4F
51F0 2D 52 41 4E 44 4F 4D 20 53 45 51 55 45 4E 43 45
5200 2E 04 0D 0A 20 20 53 45 45 44 20 42 59 54 45 20
5210 3D 20 04 0D 0A 20 20 4C 4F 47 49 43 20 4C 45 56
5220 45 4C 20 3D 20 04 0D 0A 20 20 53 41 4D 50 4C 45
5230 20 53 54 52 49 4E 47 2E 04 0D 0A 20 20 50 52 45
5240 41 4D 42 4C 45 20 57 4F 52 44 20 3D 20 20 04 0D
5250 0A 20 20 4E 55 4D 42 45 52 20 4F 46 20 53 45 51
5260 55 45 4E 54 49 41 4C 20 50 52 45 41 4D 42 4C 45
5270 20 57 4F 52 44 53 20 3D 20 04 0D 0A 20 20 45 52
5280 52 4F 52 53 20 49 4E 43 4C 55 44 45 44 20 49 4E
5290 20 45 41 43 48 20 50 52 45 41 4D 42 4C 45 20 57
52A0 4F 52 44 2E 04 0D 0A 20 20 53 49 4E 47 4C 45 20
52B0 45 43 48 4F 20 57 4F 52 44 20 3D 20 04 0D 0A 20
52C0 20 43 48 41 4E 47 45 20 28 59 2F 4E 29 3F 20 04
52D0 0D 0A 0A 20 20 53 45 4C 45 43 54 3A 0D 0A 20 20
52E0 20 31 20 2D 20 41 44 44 52 45 53 53 20 43 45 4C
52F0 4C 2E 0D 0A 20 20 20 32 20 2D 20 4E 55 4D 45 52
```

```
5300 49 43 20 44 41 54 41 20 43 45 4C 4C 2E 0D 0A 20
5310 20 20 33 20 2D 20 50 52 45 41 4D 42 4C 45 2E 0D
5320 0A 20 20 20 34 20 2D 20 53 51 55 41 52 45 20 57
5330 41 56 45 2E 0D 0A 04 0D 0A 20 20 20 3F 20 04 0D
5340 0A 0A 20 20 53 59 4E 43 20 57 4F 52 44 20 3D 20
5350 04 2E 04 0D 0A 20 20 49 4E 43 4C 55 44 45 20 45
5360 52 52 4F 52 53 20 28 59 2F 4E 29 3F 20 04 0D 0A
5370 20 20 45 4E 54 45 52 20 47 52 4F 55 50 20 49 44
5380 20 57 4F 52 44 20 28 31 20 44 49 47 49 54 29 3A
5390 20 04 0D 0A 20 20 49 4E 56 45 52 54 20 28 59 2F
53A0 4E 29 3F 20 04 0D 0A 20 20 45 4E 54 45 52 20 41
53B0 44 44 52 45 53 53 20 43 41 50 20 43 4F 44 45 20
53C0 28 36 20 44 49 47 49 54 53 29 3A 20 04 0D 0A 20
53D0 20 49 4E 43 4C 55 44 45 20 45 52 52 4F 52 53 20
53E0 49 4E 20 45 43 48 4F 20 57 4F 52 44 20 31 20 28
53F0 59 2F 4E 29 3F 20 04 0D 0A 20 20 49 4E 43 4C 55
5400 44 45 20 45 52 52 4F 52 53 20 49 4E 20 45 43 48
5410 4F 20 57 4F 52 44 20 32 20 28 59 2F 4E 29 3F 20
5420 04 0D 0A 20 20 45 4E 54 45 52 20 4E 55 4D 45 52
5430 49 43 20 44 41 54 41 20 4D 45 53 53 41 47 45 20
5440 28 55 50 20 54 4F 20 31 32 20 44 49 47 49 54 53
5450 2C 20 53 50 41 43 45 53 2C 20 2D 27 53 2C 20 45
5460 27 53 2C 20 41 4E 44 20 2F 27 53 29 3A 20 0D 0A
5470 20 20 20 20 20 04 0D 0A 20 20 49 53 20 4D 45 53
5480 53 41 47 45 20 43 4F 4E 54 49 4E 55 45 44 20 49
5490 4E 20 4E 45 58 54 20 42 4C 4F 43 4B 20 28 59 2F
54A0 4E 29 3F 20 04 0D 0A 20 20 4D 45 53 53 41 47 45
54B0 20 43 4F 4E 54 49 4E 55 45 44 20 49 4E 20 4E 45
54C0 58 54 20 42 4C 4F 43 4B 2E 04 0D 0A 20 20 45 4E
54D0 54 45 52 20 41 4C 50 48 41 2D 4E 55 4D 45 52 49
54E0 43 20 44 41 54 41 20 4D 45 53 53 41 47 45 20 28
54F0 55 50 20 54 4F 20 38 20 43 48 41 52 41 43 54 45
5500 52 53 29 3A 20 0D 0A 20 20 20 20 20 04 0D 0A 20
5510 20 45 4E 54 45 52 20 53 51 55 41 52 45 20 57 41
5520 56 45 20 53 54 41 52 54 49 4E 47 20 50 4F 4C 41
5530 52 49 54 59 20 28 30 20 4F 52 20 31 29 3A 20 04
5540 0D 0A 20 20 53 54 41 52 54 49 4E 47 20 50 4F 4C
5550 41 52 49 54 59 20 45 4E 54 45 52 45 44 2E 04 0D
5560 0A 20 20 53 45 4C 45 43 54 20 53 51 55 41 52 45
5570 20 57 41 56 45 20 46 52 45 51 55 45 4E 43 59 3A
5580 20 0D 0A 20 20 20 31 20 2D 20 36 30 30 20 48 5A
5590 2E 0D 0A 20 20 20 32 20 2D 20 33 30 30 20 48 5A
55A0 2E 0D 0A 20 20 20 33 20 2D 20 31 35 30 20 48 5A
55B0 2E 0D 0A 20 20 20 34 20 2D 20 20 37 35 20 48 5A
55C0 2E 0D 0A 04 0D 0A 20 20 46 52 45 51 55 45 4E 43
55D0 59 20 45 4E 54 45 52 45 44 2E 04 0D 0A 20 45 4E
55E0 54 45 52 20 53 51 55 41 52 45 20 57 41 56 45 20
55F0 44 55 52 41 54 49 4F 4E 20 49 4E 20 20 53 41 4D
5600 50 4C 45 53 20 28 31 2D 36 35 35 33 35 29 3A 0D
5610 0A 20 20 20 20 20 04 0D 0A 20 20 45 4E 54 45 52
5620 20 50 52 45 41 4D 42 4C 45 20 45 43 48 4F 20 57
5630 4F 52 44 20 28 31 20 44 49 47 49 54 29 3A 20 04
5640 0D 0A 20 20 50 52 45 41 4D 42 4C 45 20 57 4F 52
5650 44 20 45 4E 54 45 52 45 44 2E 04 0D 0A 20 20 45
5660 4E 54 45 52 20 4E 55 4D 42 45 52 20 4F 46 20 50
```

```
5670 52 45 41 4D 42 4C 45 20 45 43 48 4F 20 57 4F 52
5680 44 53 20 44 45 53 49 52 45 44 0D 0A 20 20 28 31
5690 2D 32 35 35 29 3A 20 04 0D 0A 20 20 4E 55 4D 42
56A0 45 52 20 4F 46 20 50 52 45 41 4D 42 4C 45 20 57
56B0 4F 52 44 53 20 45 4E 54 45 52 45 44 2E 04 0D 0A
56C0 20 20 49 4E 43 4C 55 44 45 20 45 52 52 4F 52 53
56D0 20 49 4E 20 45 41 43 48 20 45 43 48 4F 20 57 4F
56E0 52 44 27 28 59 2F 4E 29 3F 20 04 0D 0A 20 20 45
56F0 52 52 4F 52 53 20 49 4E 43 4C 55 44 45 44 20 49
5700 4E 20 45 41 43 48 20 50 52 45 41 4D 42 4C 45 20
5710 45 43 48 4F 20 57 4F 52 44 2E 04 0D 0A 0A 20 53
5720 45 4C 45 43 54 3A 0D 0A 20 20 30 20 2D 20 43 4F
5730 4E 54 52 4F 4C 20 4D 55 4C 54 49 50 4C 45 20 54
5740 52 41 4E 53 4D 49 53 53 49 4F 4E 53 2E 0D 0A 20
5750 20 31 20 2D 20 54 52 41 4E 53 4D 49 54 20 31 20
5760 51 55 45 55 45 2E 0D 0A 20 20 32 20 2D 20 50 52
5770 4F 47 52 41 4D 20 51 55 45 55 45 20 42 4C 4F 43
5780 4B 53 2E 0D 0A 04 0D 0A 0A 20 45 4E 54 45 52 20
5790 4E 55 4D 42 45 52 20 4F 46 20 54 49 4D 45 53 20
57A0 51 55 45 55 45 20 49 53 20 54 4F 20 42 45 20 54
57B0 52 41 4E 53 4D 49 54 54 45 44 0D 0A 20 28 31 2D
57C0 39 39 39 39 39 39 29 3A 20 04 0D 0A 0A 20 57 48
57D0 45 4E 20 52 45 41 44 59 20 54 4F 20 54 52 41 4E
57E0 53 4D 49 54 2C 20 54 59 50 45 20 27 47 27 2E 0D
57F0 0A 20 57 41 49 54 49 4E 47 3A 20 04 0D 0A 0A 20
5800 54 52 41 4E 53 4D 49 53 53 49 4F 4E 20 43 4F 4D
5810 50 4C 45 54 45 2E 0D 0A 04 0D 0A 0A 20 20 2A 20
5820 4D 45 4E 55 20 49 4E 43 4F 4D 50 4C 45 54 45 20
5830 2A 0D 0A 04 D4 9C F0 03 D4 DC F8 43 04 D5 63 D5
5840 69 D5 6F D4 9C F0 2B D5 95 D8 9D D4 9C F7 1B D4
5850 9C F3 37 D4 DC F8 4B 30 FB 27 31 FB 87 32 FB 61
5860 04 D4 9C F0 42 D8 28 D4 DC F8 61 01 30 39 F8 74
5870 0D F8 4B 04 D8 3A D4 DC F8 61 01 30 39 F8 83 0D
5880 F8 83 04 D8 3A D8 56 D8 E0 D8 F5 D0 00 D4 9C F2
5890 BD D4 DC F8 8D 59 F8 9C 4E F8 61 04 D4 9C F2 D0
58A0 D4 9C F3 37 D4 DC F8 9C 31 F8 B5 32 F8 BF 33 F8
58B0 C9 34 F8 D3 04 D5 3F F8 E1 00 00 F8 61 F8 9C D5
58C0 3F F9 41 00 00 F8 61 F8 9C D5 3F FA 69 00 00 F8
58D0 61 F8 9C D5 3F FA 05 00 00 F8 61 F8 9C D6 23 D5
58E0 69 D5 3F F8 EB F8 E1 F9 04 F8 41 D4 9C F3 A5 D8
58F0 28 D5 86 D4 DC F8 3D 01 30 39 F9 00 0D F8 41 04
5900 D8 3A D5 69 D5 3F F8 F3 F8 E1 F9 0E F8 E1 D5 3F
5910 F8 F3 F8 E1 F9 18 F8 E1 D5 3F F8 F3 F8 E1 F9 22
5920 F8 E1 D5 3F F8 F3 F8 E1 F9 2C F8 E1 D5 3F F8 F3
5930 F8 E1 F9 36 F8 E1 D5 EC 06 02 D5 C1 D4 DC F8 DD
5940 04 D5 3F F9 4B F9 41 F9 6C F8 41 D4 9C F4 21 D8
5950 28 D5 86 D4 DC F8 3D 01 30 39 F9 00 20 F9 00 2D
5960 F9 00 45 F9 00 2F F9 00 0D F8 41 04 D5 3F F9 53
5970 F9 41 F9 76 F9 DA D5 3F F9 53 F9 41 F9 80 F9 DA
5980 D5 3F F9 53 F9 41 F9 8A F9 DA D5 3F F9 53 F9 41
5990 F9 94 F9 DA D5 3F F9 53 F9 41 F9 9E F9 DA D5 3F
59A0 F9 53 F9 41 F9 A8 F9 DA D5 3F F9 53 F9 41 F9 B2
59B0 F9 DA D5 3F F9 53 F9 41 F9 BC F9 DA D5 3F F9 53
59C0 F9 41 F9 C6 F9 DA D5 3F F9 53 F9 41 F9 D0 F9 DA
```

```
59D0  D5 3F F9 53 F9 41 F9 DA F9 DA D6 50 D6 D3 DD 3F
59E0  F9 E8 00 00 F8 3F F9 41 D4 9C F4 76 D4 DC F9 E8
59F0  59 F9 FA 4E F8 DD 0D F8 41 04 D5 44 D4 9C F4 A5
5A00  D4 DC F8 DD 04 D4 9C F5 0D D4 DC FA 05 01 30 31
5A10  FA 16 0D F8 41 04 D7 13 D7 1A D4 9C F5 40 D4 9C
5A20  F5 5F D4 9C F3 37 D4 DC FA 1F 31 FA 3A 32 FA 42
5A30  33 FA 4A 34 FA 52 0D F8 41 04 D7 09 31 D4 DC FA
5A40  55 04 D7 09 32 D4 DC FA 55 04 D7 09 34 D4 DC FA
5A50  55 04 D7 09 38 D4 9C F5 C4 D4 9C F5 DB D8 28 D5
5A60  3F FA A6 FA 59 F8 DD 00 00 D8 28 D5 E6 D4 9C F6
5A70  17 D4 DC FA 69 01 30 39 FA 7E 0D F8 41 04 D7 21
5A80  D7 28 D4 9C F6 40 D4 9C F6 5B D5 3F FA E8 FA 86
5A90  FA 94 FA 69 D4 9C F6 98 D4 DC F8 DD 04 D4 9C F8
5AA0  19 D4 DC F8 43 04 D5 3F FA B0 F8 3D F8 3F 00 00
5AB0  D5 3F FB 16 F8 3D FA BA FA E2 D5 3F FB 16 F8 3D
5AC0  FA C4 FA E2 D5 3F FB 16 F8 3D FA CE FA E2 D5 3F
5AD0  FB 16 F8 3D FA D8 FA E2 D5 3F FB 16 F8 3D FA E2
5AE0  FA E2 D5 DC 05 03 D5 69 D5 3F FA F2 F8 3D F8 3F
5AF0  00 00 D5 3F FB 16 F8 3D FA FC FB 10 D5 3F FB 16
5B00  F8 3D FB 06 FB 10 D5 3F FB 16 F8 3D FB 10 FB 10
5B10  D5 DC 03 05 D5 69 D4 DC F8 3D 01 30 39 FB 23 0D
5B20  F8 41 04 D8 3A D5 69 D8 28 D9 35 D4 9C F7 86 D4
5B30  DC FB 27 01 30 39 FB 3C 0D F8 4B 04 D8 3A D4 DC
5B40  FB 27 01 30 39 FB 43 0D FB 90 04 D8 3A D4 DC FB
5B50  27 01 30 39 FB 5A 0D FB 90 04 D8 3A D4 DC FB 27
5B60  01 30 39 FB 69 0D FB 90 04 D8 3A D4 DC FB 27 01
5B70  30 39 FB 78 0D FB 90 04 D8 3A D4 DC FB 27 01 30
5B80  39 F3 8E 0D FB 90 04 D7 2F D4 DC FB 92 04 D8 3A
5B90  D9 3E D4 9C F7 CA D4 DC FB 8E 47 FB 9E 04 D3 97
5BA0  D4 9C F7 FC D4 DC F8 4B 04 00 00 00 00 00 00 00
5BB0  00 00 00 00 00 00 00 00 00 00 00 00 00 00 00 00
5BC0  00 00 00 00 00 00 00 00 00 00 00 00 00 00 00 00
5BD0  00 00 00 00 00 00 00 00 00 00 00 00 00 00 00 00
5BE0  00 00 00 00 00 00 00 00 00 00 00 00 00 00 00 00
5BF0  00 00 00 00 00 00 00 00 00 00 00 00 00 00 00 00
```

We claim:

1. A method of encoding information signals for transmission to a plural population of receivers, each said receiver being capable of selectively establishing more than one time period for address correlation and having an audio circuit, comprising the steps of:

generating coded signals to address selected ones of said plural receiver population;

generating information of selectively variable length, subsequent to said coded signals, to be processed by said selected ones of said plural receiver population;

generating coded deactivation signals immediately after the end of said information of selectively variable length causing said selected ones of said plural receiver population to terminate processing of said information.

2. A method of encoding, according to claim 1, wherein said step of generating coded deactivation signals further comprises the step of:

deactivating the audio circuits of said selected ones of said plural receiver population.

3. A method of encoding, according to claim 1, wherein said step of generating code signals to address is preceded by the step of:

generating a first set of coded signals to establish one of at least a first and second time period for said plural population of receivers to correlate for an address.

4. A method of encoding information signals including a receiver address, for transmission to a plural population of receivers, each said receiver being capable of selectively establishing more than one time period for address correlation, having a predetermined alert sequence and an audio circuit, comprising the steps of:

generating a first set of coded signals to establish one of at least a first and second time period for said plural population of receivers to correlate for an address;

generating a second set of coded signals to select at least one selected receiver of said plural receiver population;

generating a first activation code signal, subsequent to said second set of coded signals, for activating the predetermined alert sequence of said at least one selected receiver; and generating a second activation code signal at a selectively variable period of time after said first activation code signal for deactivating said at least one selected receiver from responding.

5. A method of encoding, according to claim 4, further comprising the step of:

generating additional said first and second sets of coded signals for at least one selected other receiver of said plural receiver population during the duration of said predetermined alert sequence of said at least one selected receiver.

6. A method of encoding, according to claim 5, wherein said step of generating a second activation code signal is also for activating the predetermined alert sequence of said at least one selected other receiver.

7. A method of encoding, according to claim 4, wherein said step of generating a first set of coded signals includes the steps of:

generating one of a preamble signal and an inverted preamble signal thereby selecting one of the first and second time periods, respectively, of said plural population of receivers.

8. A method of encoding, according to claim 7, wherein:

selecting said first time period causes said at least one selected receiver to correlate one said second set of coded signals, and selecting said second time period causes said at least one select receiver to correlate a plurality of second sets of coded signals.

9. A method for encoding information signals including a receiver address for transmission of information to a plural population of receivers, each said receiver having a predetermined alert sequence, comprising the steps of:

generating coded signals for selecting at least one selected receiver of said plural receiver population;

generating a first activation code signal subsequent to said coded signals for activating the predetermined alert sequence of said at least one selected receiver;

generating a second activation code signal at a selectively variable period of time after the end of said preselected alert sequence for deactivating said at least one selected receiver.

10. An encoding device for generating sequential code signals containing information which are to be transmitted to a plural population of receivers, comprising:

means for generating coded signals to address selected ones of said plural population of receivers;

means for generating information of selectively variable length to be processed by said selected ones of said plural population of receivers, subsequent to said coded signals to address; and means for generating coded deactivation signals immediately after the end of said information of selectively variable length which causes said selected ones of said plural receiver population to terminate processing of said information.

11. An encoding device, according to claim 10, further comprising:

means for generating a first set of coded signals, prior to the generation of said coded signals to address, for selecting one of at least a first and a second time period for said plural population of receivers to correlate for an address.

12. An encoding device for generating sequential code signals containing information which are to be transmitted to a plural population of receivers, each said receiver being capable of establishing more than one time period for address correlation and having a predetermined alert sequence, comprising:

means for generating coded signals to address at least one selected receiver of said plural population of receivers;

means for generating a first activation code signal subsequent to said coded signals to address, for activating the predetermined alert sequence of said at least one selected receiver;

means for generating a second activation code signal at a selectively variable period of time after said first activation code signal, for deactivating said at least one selected receiver from responding.

13. An encoding device, according to claim 12, further comprising:

means for generating a first set of coded signals for selecting one of at least a first and second time period for said plural population of receivers to correlate for an address, prior to generating coded signals to address selected ones of said plural population of receivers.

14. An encoding device, according to claim 13, further comprising:

means for generating additional first sets of coded signals and coded signals to address, for at least one selected other receiver of said plural receiver population during the duration of said predetermined alert sequence of said at least one selected receiver.

15. An encoding device for generating sequential code signals containing information which are transmitted to a plural population of receivers, each said receiver capable of selectively establishing more than one time period for address correlation and having a predetermined alert sequence, comprising:

selecting means for storing and selecting the code signals to be transmitted, said code signals including a first set of coded signals to select one of at least a first and second time period for said plural population of receivers to correlate at least one address, a second set of coded signals to address at least one selected receiver of said plural receiver population, and an activation code signal for at least activating the predetermined alert sequence of said plural population of receivers;

transmitting means, connected to said selecting means, for transmitting said code signals;

control circuit means, connected to said selecting means and said transmitter means, further including:

means for enabling said selector means to generate a selected first set of coded signals to select one of at least a first and second time period for said plural population of receivers to correlate at least one address, means for enabling said selector means to generate a selected second set of coded signals to address at least one selected receiver of said plural receiver population, means for enabling said selector means to generate a first activation code signal subsequent to said second set of coded signals for activating the predetermined alert sequence of said at least one selected receiver, means for enabling said selector means to generate additional selected first and second sets of code signals for at least one selected other receiver, means for enabling said selector means to generate a second activation code signal at a selectively variable period of time after said first activation code signal, for deactivating said at least one selected receiver, means for enabling said selector means to generate at least an additional selected second set of coded signals to address at least one seleted other receiver of said plural receiver population during the duration of said predetermined alert sequence of said at least one selected receiver, and means for enabling said selector means to generate a second activation code signal at a selectively variable period of time after said first activation code signal for deactivating said at least one selected receiver from responding and activating the preselected alert sequence of said at least one selected other receiver, in accordance with said selecting means.

16. An encoding device, according to claim 15, further comprising:

audio generating means, connected to said first transmitter means and said control circuit means, for generating an audio message;

said control circuit means for further controlling the sequence of transmission of said audio message and said code signal.

17. An encoding device, according to claim 16, wherein said selecting means further comprises:

a keyboard having selection keys;

a keyboard decoder, connected to said keyboard, for decoding signals from said keyboard;

a word file memory, connected to said keyboard decoder and said control circuit means for storing and generating code signals in response to said keyboard decoder and said control circuit means; and a shift register means, connected to said word file memory and said control circuit means, for generating serial code signals.

18. An encoding device according to claim 17, wherein said control circuit means, further comprises:

a programmable logic array circuit having a programmable timer for controlling the duration of preselected portions of said code signals and the duration of transmission of said audio messages;

a timer, connected to said programmable logic array circuit and said shift register means, for providing a time base thereof; and a switching means, connected to said transmitter means, said audio generating means, said shift register, and said programmable logic array circuit for switching from transmission by said transmitter means of said coded signals to said audio messages and vice-versa.

19. An encoding device, according to claim 16, wherein said selecting means comprises:

a keyboard and keyboard controller; and a visual display device.

20. An encoding device, according to claim 19, wherein said control circuit means further comprises:

processing means for generating the code signals to be transmitted and for controlling the duration of preselected portions of said code signals and the duration of transmission of said audio message;

audio data select means, connected to said processing means, for generating an output indicating which one of said audio message and said code signal should be transmitted;

audio data detection means, connected to said processing means and said transmitter means, for generating an output indicating that one of said audio message and said code signal should be transmitted; and switching means, connected to said processing means, said audio data select means, said audio generating means and said transmitting means for switching from the transmission by said transmitter means of said code signals to said voice messages and vice-versa.

21. An encoding device, according to claim 16, wherein said control circuit means further comprises:

processing means, for generating the code signals to be transmitted and for controlling the duration of preselected portions of said code signals and the duration of transmission of said audio message;

audio data select means, connected to said processing means, for generating an output indicating which one of said audio message and said code signal should be transmitted;

audio data detection means, connected to said processing means and said transmitter means for generating an output indicating that one of said audio message and said code signal should be transmitted; and switching means, connected to said processing means, said audio data select means, said audio generating means and said transmitted means for switching from the transmission by said transmitter means of said code signals to said audio messages and vice-versa.

* * * * *